Patented Feb. 15, 1938

2,108,783

UNITED STATES PATENT OFFICE 2,108,783

PROCESS OF SEPARATING INORGANIC SALTS FROM SOLUTIONS

George W. Smith, Pittsburgh, Pa., assignor to Hall Laboratories, Inc., Pittsburgh, Pa., a corporation of Pennsylvania No Drawing. Application March 12, 1936, Serial No. 68,445

8 Claims. (Cl. 23—50)

This invention relates to a process of separating inorganic salts from solutions and provides means whereby impurities in the solution, such as alkaline earth metal salts and salts of divalent heavy metals, for example ferrous iron and cupric copper, are maintained in solution during precipitation of the inorganic salt from solution.

The present invention is applicable to the crystallization of common salt from solutions containing this salt and, in addition, calcium salts as impurities. Virtually all commercial sodium chloride brines contain quantities of calcium sulphate. These brines are evaporated either in open vessels or under vacuum. As the brine solution becomes saturated with sodium chloride, crystals of sodium chloride are deposited from solution in the bottom of the pan or crystallizer. At the same time, the solution becomes saturated with calcium salts, principally calcium sulphate. A part of this calcium sulphate precipitates under certain conditions as scale upon the heating surfaces and a part of it precipitates as calcium sulphate sludge along with the sodium chloride, thereby contaminating the sodium chloride.

I have found that the calcium sulphate or other calcium salt present in the solution of sodium chloride as an impurity may be prevented from crystallizing out of solution with the sodium chloride upon heating the solution, if an alkali-metal hexametaphosphate is added to the solution. The preferred alkali-metal hexametaphosphate is sodium hexametaphosphate, sometimes called "Graham's salt". The alkali-metal hexametaphosphate has the property of forming with calcium and magnesium and other divalent heavy metals, soluble very slightly ionized compounds of these metals. In other words, the alkali-metal hexametaphosphate has the property of sequestering the calcium, magnesium and other metals in a soluble and but slightly ionized condition so that these metals do not precipitate along with the sodium chloride as the sodium chloride crystallizes from solution upon heating.

The quantities of sodium hexametaphosphate, for example, which should be used for preventing precipitation of the calcium sulphate will vary according to the pH value of the solution and according to the solubility of the substance whose precipitation is to be avoided. If the sodium chloride solution has a pH value of 7, precipitation of calcium sulphate may be prevented by adding to the solution sodium hexametaphosphate in an amount about eight times by weight of the quantity of calcium which is present in the solution. The quantities of sodium hexametaphosphate will increase with increasing pH values of the solution and decreasing solubility of the substance whose precipitation is to be avoided. Thus, where trisodium phosphate is being crystallized from a brine containing calcium as an impurity, the pH value of the brine will be high. Furthermore, calcium phosphate is quite insoluble. In this case the amount of sodium hexametaphosphate which should be used is approximately fifteen times the weight of the calcium which is present in the solution.

As another example, the invention is useful in carrying out the precipitation of ammonium sulphate from ammonium sulphate brine to which gaseous ammonia and sulphuric acid are continuously added. Calcium and magnesium from the water used in making the brine, and any calcium, magnesium, ferrous iron or cupric copper or other divalent alkaline earth or heavy metal present in the sulphuric acid as impurities, may be held in solution during the precipitation process by addition to the solution of suitable quantities of an alkali-metal hexametaphosphate. Calcium and magnesium find their way into sulphuric acid from the water which is used in the manufacture of the acid.

When solutions containing sodium hexametaphosphate are subjected to prolonged heating at high temperatures, the metaphosphate reacts with water to form mono-sodium orthophosphate which does not have the property of sequestering and keeping in solution the calcium, magnesium and other divalent alkaline earth or heavy metals. The present process, therefore, is not applicable where temperatures are employed which will cause conversion of the hexametaphosphate into the orthophosphate. For example, in the case of precipitation conducted in baths having a temperature of 200° C., the conversion would occur very rapidly and the present process would not be applicable. At lower temperatures, such as 100° C., the sodium hexametaphosphate will have an effective life of two or three hours and the process would, therefore, be feasible at atmospheric boiling temperatures, provided such temperatures were not maintained for too long a time. Where vacuum is employed in carrying out the precipitation, the temperature may be as low as 50 to 60° C., and at these temperatures the hexametaphosphate has an indefinite life and may be used in processes in which such temperatures are employed for 24 hours or more.

While I prefer to use sodium hexametaphosphate, other alkali-metal hexametaphosphates may be used, such, for example, as potassium, lithium or ammonium hexametaphosphates.

The invention is applicable to the separation of inorganic salts from solutions containing as impurities any of the alkaline earth or divalent heavy metals. For example, sodium hexametaphosphate holds in solution calcium, magnesium, ferrous iron, cupric copper, lead, strontium, barium, manganese, zinc, cadmium, cobalt, and the like. When these metals or their salts are present as impurities, they may be held in solution during precipitation of the inorganic salt by adding suitable amounts of an alkali-metal hexametaphosphate to the solution.

I have described several applications of my invention. It is to be understood, however, that these applications are illustrative only and that the invention is not limited thereto, but may be otherwise embodied within the scope of the following claims.

I claim:

1. A process of separating an alkali-metal or ammonium salt from a solution containing the same and in addition an impurity of the group consisting of alkaline earth metal salts and salts of the divalent heavy metals, which comprises adding an alkali-metal hexametaphosphate to the solution to hold the impurities in solution, and evaporating the solution under vacuum to precipitate the alkali-metal or ammonium salt.

2. A process of separating an alkali-metal or ammonium salt from a solution containing the same and in addition an alkaline earth metal salt as an impurity, which comprises adding an alkali-metal hexametaphosphate to the solution to hold the alkaline earth metal salt in solution, and evaporating the solution to precipitate the alkali-metal or ammonium salt.

3. A process of separating an alkali-metal or ammonium salt from a solution containing the same and in addition calcium salt as an impurity, which comprises adding an alkali-metal hexametaphosphate to the solution to hold the calcium salt in solution, and evaporating the solution to precipitate the alkali-metal or ammonium inorganic salt.

4. A process of separating an alkali-metal or ammonium salt from a solution containing the same and in addition an impurity of the group consisting of alkaline earth metal salts and salts of divalent heavy metals, which comprises adding an alkali-metal hexametaphosphate to the solution to hold the impurities in solution, and evaporating the solution to precipitate the alkali-metal or ammonium salt.

5. A process of separating an inorganic salt of the group consisting of sodium chloride, trisodium phosphate and ammonium sulphate from a solution containing the same and in addition an impurity of the group consisting of alkaline earth metal salts and salts of divalent heavy metals, which comprises adding an alkali-metal hexametaphosphate to the solution to hold the impurities in solution, and evaporating the solution to precipitate the inorganic salt.

6. A process of separating an alkali-metal or ammonium salt from a solution containing the same and in addition an impurity of the group consisting of alkaline earth metal salts and salts of divalent heavy metals, which comprises adding an alkali-metal hexametaphosphate to the solution to hold the impurities in solution, and evaporating the solution at a temperature below about 100° C. to precipitate the alkali-metal or ammonium salt.

7. A process of separating an alkali-metal or ammonium salt from a solution containing the same and in addition an impurity of the group consisting of alkaline earth metal salts and salts of divalent heavy metals, which comprises adding an alkali-metal hexametaphosphate to the solution to hold the impurities in solution, and evaporating the solution at a temperature below about 100° C. and under reduced pressure to precipitate the alkali-metal or ammonium salt.

8. A process of separating an alkali-metal chloride from a solution containing the same and in addition a calcium salt as an impurity, which comprises adding an alkali-metal hexametaphosphate to the solution to hold the calcium salt in solution, and evaporating the solution to precipitate the alkali-metal chloride.

GEORGE W. SMITH.

---

CERTIFICATE OF CORRECTION.

Patent No. 2,108,783. February 15, 1938.

GEORGE W. SMITH.

It is hereby certified that error appears in the printed specification of the above numbered patent requiring correction as follows: Page 2, first column, line 45-46, claim 3, strike out the word "inorganic"; and that the said Letters Patent should be read with this correction therein that the same may conform to the record of the case in the Patent Office.

Signed and sealed this 29th day of March, A. D. 1938.

(Seal)

Henry Van Arsdale,
Acting Commissioner of Patents.

may be used, such, for example, as potassium, lithium or ammonium hexametaphosphates.

The invention is applicable to the separation of inorganic salts from solutions containing as impurities any of the alkaline earth or divalent heavy metals. For example, sodium hexametaphosphate holds in solution calcium, magnesium, ferrous iron, cupric copper, lead, strontium, barium, manganese, zinc, cadmium, cobalt, and the like. When these metals or their salts are present as impurities, they may be held in solution during precipitation of the inorganic salt by adding suitable amounts of an alkali-metal hexametaphosphate to the solution.

I have described several applications of my invention. It is to be understood, however, that these applications are illustrative only and that the invention is not limited thereto, but may be otherwise embodied within the scope of the following claims.

I claim:

1. A process of separating an alkali-metal or ammonium salt from a solution containing the same and in addition an impurity of the group consisting of alkaline earth metal salts and salts of the divalent heavy metals, which comprises adding an alkali-metal hexametaphosphate to the solution to hold the impurities in solution, and evaporating the solution under vacuum to precipitate the alkali-metal or ammonium salt.

2. A process of separating an alkali-metal or ammonium salt from a solution containing the same and in addition an alkaline earth metal salt as an impurity, which comprises adding an alkali-metal hexametaphosphate to the solution to hold the alkaline earth metal salt in solution, and evaporating the solution to precipitate the alkali-metal or ammonium salt.

3. A process of separating an alkali-metal or ammonium salt from a solution containing the same and in addition calcium salt as an impurity, which comprises adding an alkali-metal hexametaphosphate to the solution to hold the calcium salt in solution, and evaporating the solution to precipitate the alkali-metal or ammonium inorganic salt.

4. A process of separating an alkali-metal or ammonium salt from a solution containing the same and in addition an impurity of the group consisting of alkaline earth metal salts and salts of divalent heavy metals, which comprises adding an alkali-metal hexametaphosphate to the solution to hold the impurities in solution, and evaporating the solution to precipitate the alkali-metal or ammonium salt.

5. A process of separating an inorganic salt of the group consisting of sodium chloride, trisodium phosphate and ammonium sulphate from a solution containing the same and in addition an impurity of the group consisting of alkaline earth metal salts and salts of divalent heavy metals, which comprises adding an alkali-metal hexametaphosphate to the solution to hold the impurities in solution, and evaporating the solution to precipitate the inorganic salt.

6. A process of separating an alkali-metal or ammonium salt from a solution containing the same and in addition an impurity of the group consisting of alkaline earth metal salts and salts of divalent heavy metals, which comprises adding an alkali-metal hexametaphosphate to the solution to hold the impurities in solution, and evaporating the solution at a temperature below about 100° C. to precipitate the alkali-metal or ammonium salt.

7. A process of separating an alkali-metal or ammonium salt from a solution containing the same and in addition an impurity of the group consisting of alkaline earth metal salts and salts of divalent heavy metals, which comprises adding an alkali-metal hexametaphosphate to the solution to hold the impurities in solution, and evaporating the solution at a temperature below about 100° C. and under reduced pressure to precipitate the alkali-metal or ammonium salt.

8. A process of separating an alkali-metal chloride from a solution containing the same and in addition a calcium salt as an impurity, which comprises adding an alkali-metal hexametaphosphate to the solution to hold the calcium salt in solution, and evaporating the solution to precipitate the alkali-metal chloride.

GEORGE W. SMITH.

---

CERTIFICATE OF CORRECTION.

Patent No. 2,108,783.            February 15, 1938.

GEORGE W. SMITH.

It is hereby certified that error appears in the printed specification of the above numbered patent requiring correction as follows: Page 2, first column, line 45-46, claim 3, strike out the word "inorganic"; and that the said Letters Patent should be read with this correction therein that the same may conform to the record of the case in the Patent Office.

Signed and sealed this 29th day of March, A. D. 1938.

(Seal)

Henry Van Arsdale,
Acting Commissioner of Patents.

CERTIFICATE OF CORRECTION.

Patent No. 2,108,783.  February 15, 1938.

GEORGE W. SMITH.

It is hereby certified that error appears in the printed specification of the above numbered patent requiring correction as follows: Page 2, first column, line 45-46, claim 3, strike out the word "inorganic"; and that the said Letters Patent should be read with this correction therein that the same may conform to the record of the case in the Patent Office.

Signed and sealed this 29th day of March, A. D. 1938.

(Seal)

Henry Van Arsdale,
Acting Commissioner of Patents.